United States Patent
Maw

Patent Number: 5,668,934
Date of Patent: Sep. 16, 1997

[54] INTERFACE TO SOPHISTICATED PRINTERS

[75] Inventor: David George Maw, Lake Elsinore, Calif.

[73] Assignee: Unisys Corporation, Blue Bell, Pa.

[21] Appl. No.: 598,129

[22] Filed: Feb. 7, 1996

Related U.S. Application Data

[63] Continuation of Ser. No. 92,636, Jul. 16, 1993.

[51] Int. Cl.$^6$ .................................................. G06F 15/00
[52] U.S. Cl. ........................ 395/110; 395/109; 395/101
[58] Field of Search ........................ 395/101, 110, 395/109, 107, 117, 115, 116, 150, 151, 114, 112, 102, 144, 145; 400/17, 61, 62, 76; 345/143, 141, 192, 193, 194, 195; 358/296; 346/45; 347/900, 5

[56] References Cited

U.S. PATENT DOCUMENTS

| | | | |
|---|---|---|---|
| 4,381,553 | 4/1983 | Ferguson | 400/17 |
| 4,715,006 | 12/1987 | Nagata | 395/110 |
| 4,849,883 | 7/1989 | Mitchell et al. | 395/101 |
| 4,937,565 | 6/1990 | Suwannukul | 345/195 |

*Primary Examiner*—Edward L. Coles, Sr.
*Assistant Examiner*—Dov Popovici
*Attorney, Agent, or Firm*—J. Ronald Richebourg; Mark T. Starr; Steven R. Petersen

[57] ABSTRACT

A method is disclosed that enables changing of print commands for traditional line printers to character highlighting capabilities offered by modern non-impact type printers. The disclosed method provides a technique to look ahead in a stream of data to be printed and determining if a modification of the print is to occur. If so, a table of attributes is provided for indexing to the changed character for transmission to the printer.

2 Claims, 5 Drawing Sheets

5,668,934

INTERFACE TO SOPHISTICATED PRINTERS

This is a continuation of copending application Ser. No. 08/092,636 filed Jul. 16, 1993.

FIELD OF THE INVENTION

The invention relates in general to a method for changing print commands for a traditional line printer to character highlighting capabilities offered by modern printing devices. More particularly, the present invention relates to a method of looking ahead at a stream of data to be printed, determining if a modification of the print is to occur and indexing into a table for a new or different print command.

BACKGROUND OF THE INVENTION

A large number of existing computer programs have been written for dependency upon traditional line printers. For example, if one or more characters were to be printed in bold print, the print command would be to make one or more additional passes on the same line of print so as to form a bold character by overstriking. In a similar manner, if an underline of the print were desired, then the print instruction would be to make another pass over the printed line, only this time an underscore character would print.

More specifically, a traditional interface to a line printer takes the form of a series of records, each of which contains both data to be printed and an operation to be performed after printing the data. The operation to be performed is typically (SPACE 1) meaning, space down one line after printing the data. Another typical operation is (NO) meaning that no paper motion should be performed after printing the data. If a (NO) operation is performed, the next line of data will overprint the current line. On an impact printer, overprinting a character with another copy of itself will cause the resulting text to appear bold, overprinting a second or subsequent time may produce a character that is bolder yet. With a modern non-impact printer, such as a laser printer, the overprint operation will have no visible effect.

BRIEF SUMMARY OF THE INVENTION

It is therefore an object of this invention to provide a method for converting print commands by indexing into a reference table for new or different print commands.

It is also an object of the present invention to provide a method for converting existing programs having print commands that were generated for traditional line printers into print commands suitable for modern non-impact printers.

An advantage of the present invention is the obviation of the rewriting of existing programs for use with modern non-impact printers.

A feature of the present invention resides in the provision of a modifiable look-up table for print commands, thereby providing flexibility in modifying print commands.

The foregoing are achieved as is now described. The present invention is a method in a computer system for modifying commands to a printer comprising the steps of storing in said computer system a first block of characters to be printed; examining the operation code at the end of the block of characters to determine if the same line is to be repeated; and, if so, counting in a line buffer of said computer system for said printer each character that is to be an overprint; storing the overprint count for each character; indexing into a table of attributes stored in said computer system as a function of the overprint count; and, transmitting attribute setting code for the changed attributes to the printer.

BRIEF DESCRIPTION OF THE DRAWINGS

The novel features believed characteristic of the invention are set forth in the appended claims. The invention, however, as well as a preferred mode of use, will best be understood more clearly from the following description and from the accompanying figures. These figures are given solely by way of indication and in no way restrict the scope of the invention.

Of these figures.

DETAILED DESCRIPTION

Figure 1:
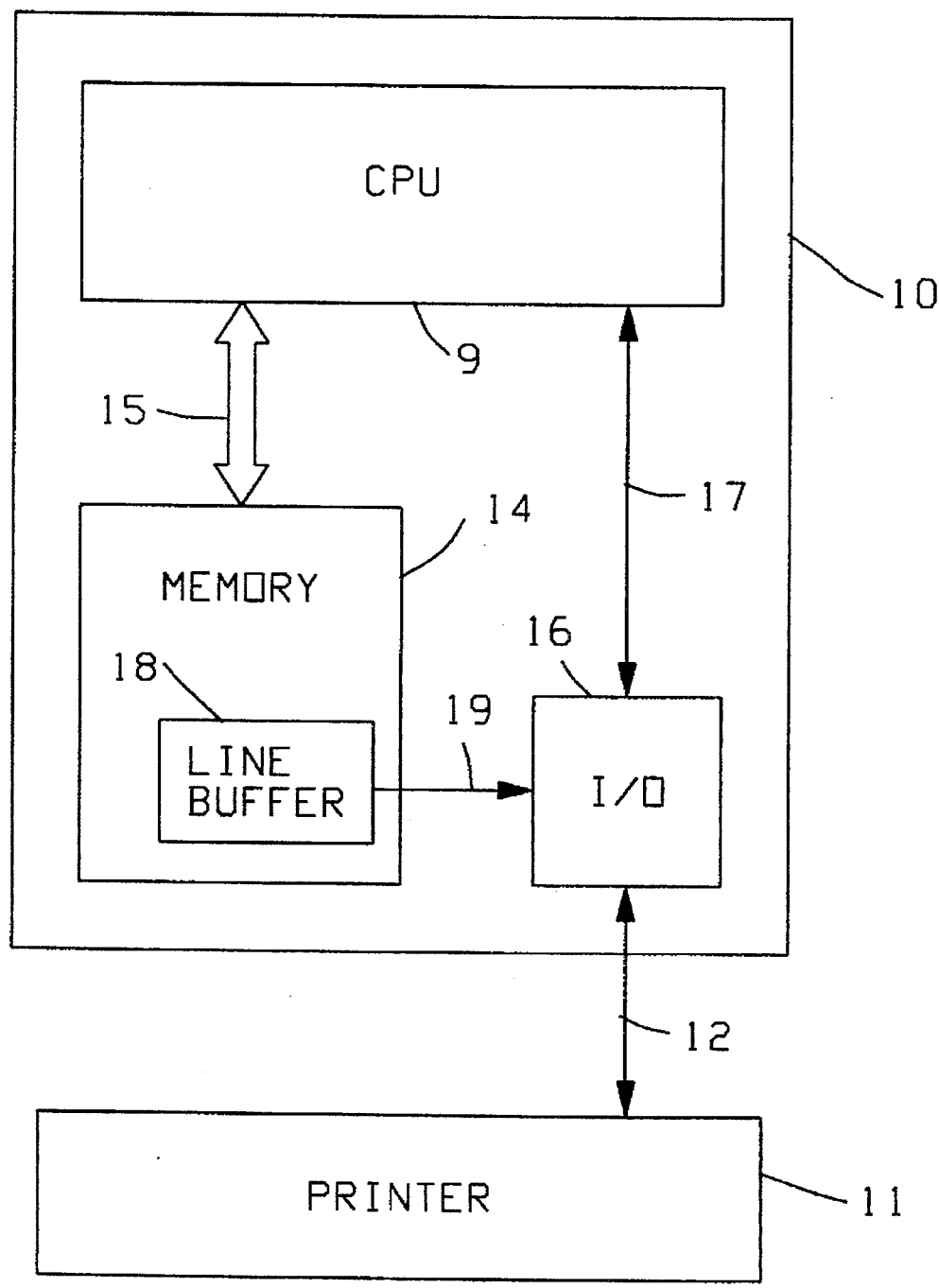
FIG. 1 shows a functional diagram of an exemplary digital computer in which the method of the present invention is useful.

With reference to FIG. 1, an exemplary digital computer 10 is shown functionally to illustrate an environment in which the method of the present invention may be practiced. A printer 11 is coupled to the computer 10 by means of a bus 12. Within the computer 10 is a central processing unit (CPU) 9 coupled to a memory 14 by means of a memory bus 15. Also, an input/output processor (I/OP) 16 is coupled to the CPU 9 by means of a bus 17. Instructions to the printer 11 are supplied on the bus 17 from the CPU 9, and data to be printed are supplied from a line buffer 18 over a bus 19. The line buffer 18 may, for example, comprise a portion of memory 14 (as shown).

A traditional application to a line printer takes the form of a series of records, each of which contains a block of data to be printed and an operation to be performed after printing the data. The operation to be performed is typically {SPACE 1}, which means to space down one line after printing the block of data. Another typical operation is {NO}, which means that no paper motion should be performed after printing the data. If a {NO} operation is performed, the next block of data will overprint the current one. On an impact printer, overprinting a character with another copy of itself will cause the resulting text to appear bold. If the character is overprinted a second or subsequent time, the resulting print is bolder yet. Such overprint commands to a non-impact printer, such as a laser printer, will not produce any visible effect.

Take the following example, which shows three records and their corresponding operation codes [either {NO} or {SPACE 1}]:

| | |
|---|---|
| normal print,bold print, very bold print, | normal print{NO} |
| bold print, very bold print, | {NO} |
| very bold print, | {SPACE 1} |

The resulting output printed on an impact printer (i.e., line printer) would look like the following:

Normal print, bold print, very bold print, normal print

This is produced by the words "normal print" being printed once, the words "bold print" being printed twice, and the words "very bold print" being printed three times.

If a printer with different capabilities is used to print this text while using the method of the present invention, the user is allowed to set up a table of attributes for use when overprint text is encountered.

TABLE I

| Overprint | Character Size | ATTRIBUTE TO BE SET | | |
|---|---|---|---|---|
| | | Upright or Italic | Weight | etc. |
| None | 12 point (⅙ inch) | Upright | Medium | |
| Once | 12 point (⅙ inch) | Upright | Bold | |
| Twice | 12 point (⅙ inch) | Italic | Medium | |
| etc. | | | | |

If the TABLE I attributes were used to print, then the result would have the following text appearance:
normal print, bold print, very bold print, normal print Taking another example, if the following attribute table were loaded, the appearance of the text might be quite different, since the attributes specified and their values are different.

TABLE II

| Overprint | Character Size | ATTRIBUTE TO BE SET | | |
|---|---|---|---|---|
| | | Typeface | Weight | etc. |
| None | 12 point (⅙ inch) | Courier | Medium | |
| Once | 16 point (⅙ inch) | Times | Medium | |
| Twice | 16 point (⅙ inch) | Times | Bold | |
| etc. | | | | |

Figure 2:
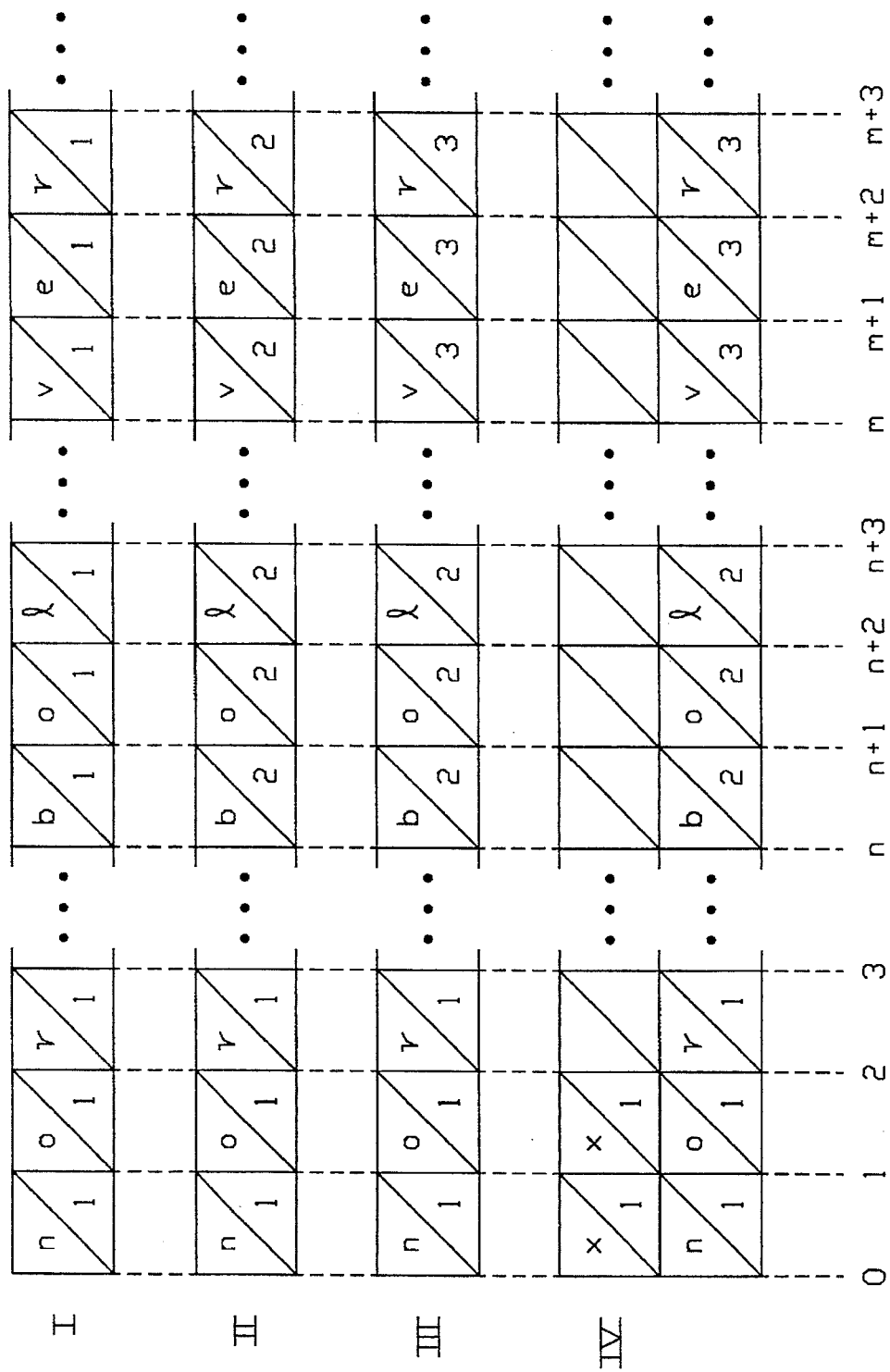
FIG. 2 shows a diagram of various states of the line buffer serving the printer, illustrating operation of the present invention; and, FIG's. 3–5 show the logical sequence of the method of the present invention.

This attribute mapping table would result in the following text appearance on a suitably equipped printer:
normal print, bold print, very bold print,, normal print Referring now to FIG. 2, a map of the line buffer 18 is illustrated during performance of the above-described operations. Row I represents the first line as follows:
normal print, bold print, very bold print, normal print{NO}

Each character square is divided in half so as to represent the character to be printed and the number of times it is to be overprinted. All characters in Row I have an overprint value equal to one. In Row II, however, we see a change in column n,n+1, wherein the overprint value is equal to two. As will be explained in further detail hereinafter, the overprint value is obtained by examining each character position to determine the number of times it is to be overprinted. In Row III the overprint value is three for the very bold characters. Row IV is identical to Row III with the exception that the first two characters are to be overprinted with the letter "x", as if to show a deletion. Moreover, to create characters in some foreign languages, a combination of characters are overprinted in a manner similar to that shown in Row IV. For example, if an "o" is overstriken with a slash ("/"), the Greek letter Phi ("φ") is created.

Figure 3:
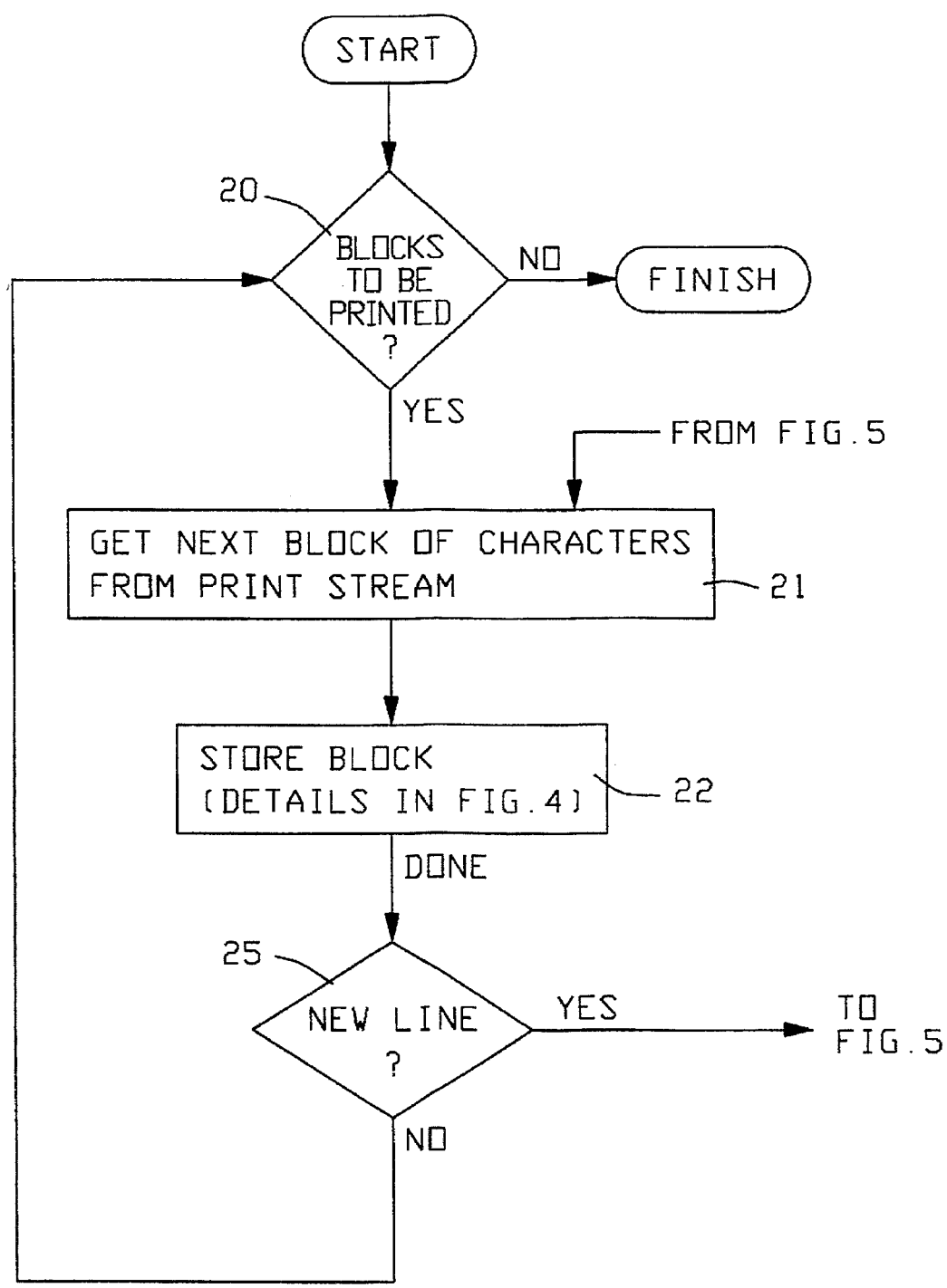

With the above-described background, reference is now made to FIG. 3, which is the first of three interconnected flow charts illustrating the sequence of the method of the present invention. The START operation leads to a decision diamond 20, which asks if there are blocks of data to be printed. Obviously, if the answer is NO, then the operation is over, or FINISH. If the answer is YES, then the next block of characters to be printed are obtained from the print stream, as represented by function 21. The block of characters to be printed may typically reside in the memory 14.

Next, this block of characters is stored in the line buffer 18 as depicted by the function 22.

Figure 4:
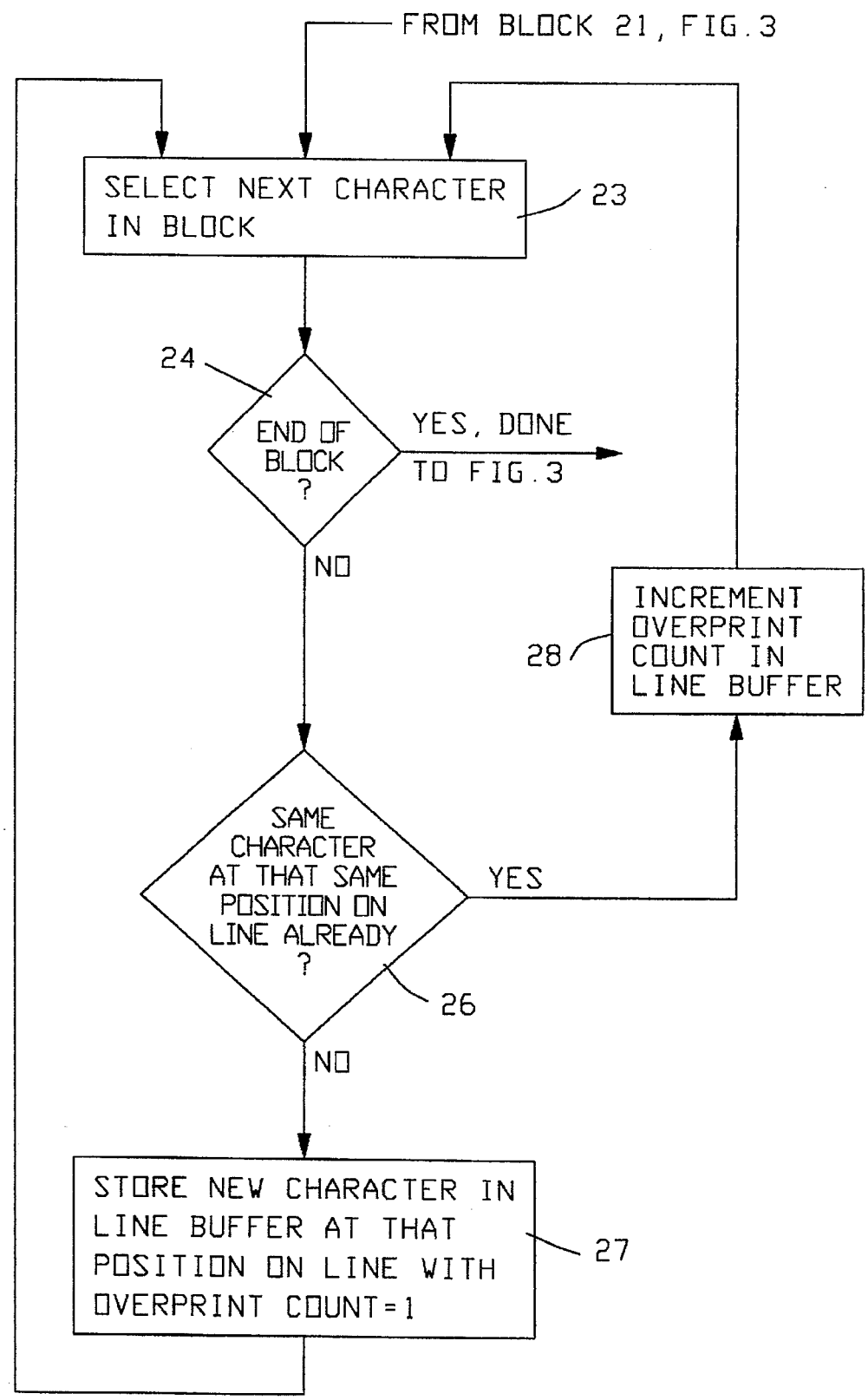

Details of the operation performed in the Store Block function 22 are illustrated in greater detail in FIG. 4. Each character in the block of characters to be printed is individually examined to determine the number of times it is to be overprinted. The next character in the block is selected (function 23). Decision diamond 24 next depicts the question: is this the end of the Block? If the answer is YES, then a return is made to the decision diamond 25 in FIG. 3. If it is NO, then it is to be determined if the same character is to be printed at that same position on the line (decision diamond 26). For the first pass the answer is NO, and the new character is stored in the line buffer 18 at that position and the overprint count is set at one (function 27). Reference is briefly made to FIG. 2 wherein Row I illustrates the results of the line buffer during this first pass. The next character in the block is selected, as depicted by decision diamond 23, and the process is repeated until all characters in the block have been examined.

If the same character is at that same position in the block (function 26), then the overprint count in the line buffer is incremented (function 28), and the process is repeated until the end of the block is reached (decision diamond 24). Again, brief reference is made to FIG. 2, wherein Rows II and III illustrate an example of the results of this operation.

At this juncture of the description it should be pointed out that a "block" refers to text to be printed plus a command, {SPACE_} or {NO}. A "line" is equal to one or more blocks, and a line is equal to a block where there is no overprint of characters to be performed.

Figure 5:
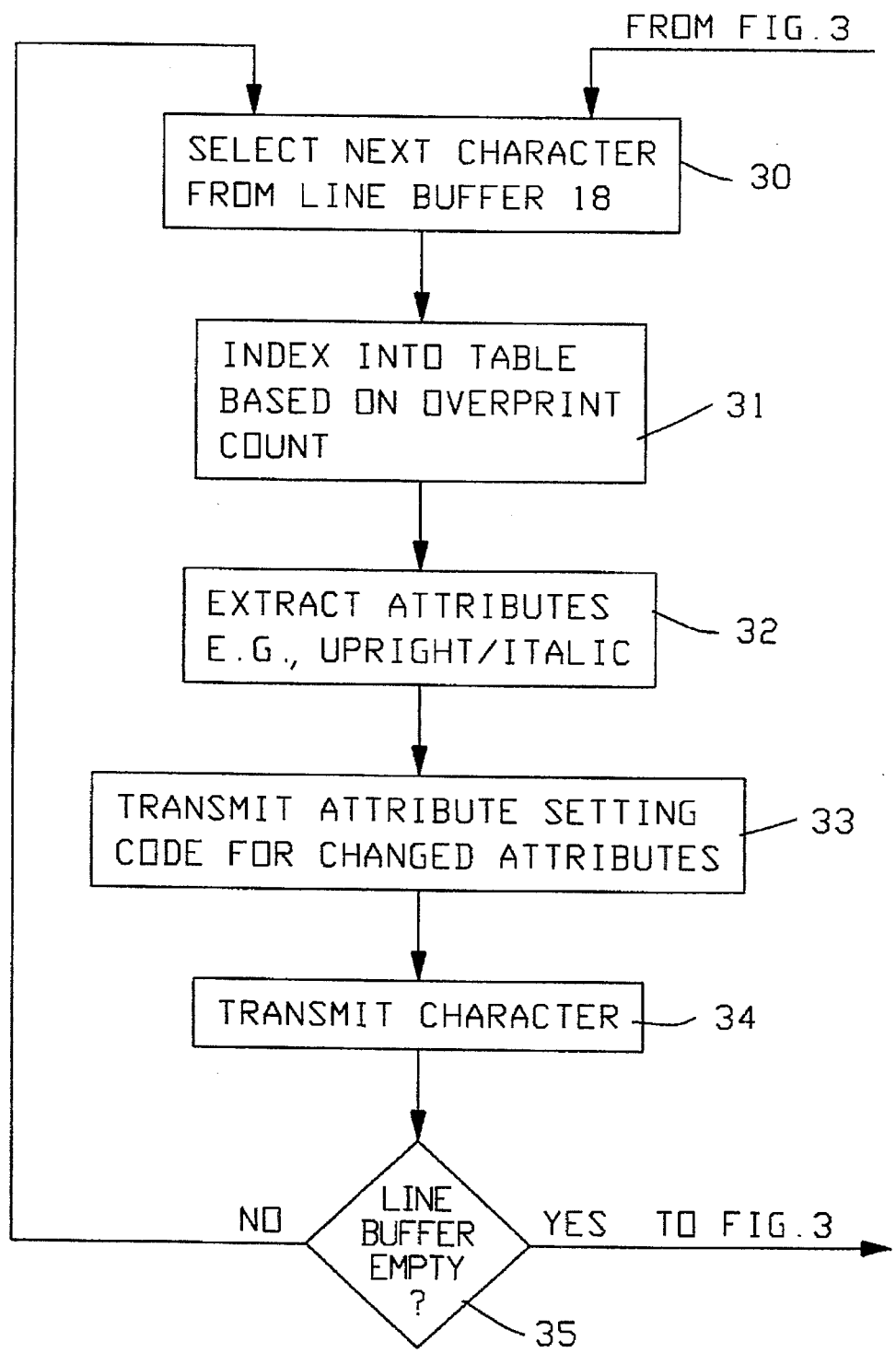

If the end of the line (decision diamond 25 in FIG. 3) is reached, then a branch is made to the operations shown in FIG. 5. A character is again selected (function 30) from the line buffer 18. An index is made (function 31) into the table (such as TABLE I or II above) based upon the overprint count. The attributes (e.g., UPRIGHT/ITALIC) in the table are extracted (function 32). The attribute selected is transmitted (function 33) to the printer 11, followed by transmitting the character (function 34) to the printer. Decision diamond 35 next represents the question: is the line buffer empty? If NO then the process is repeated until it is empty. If YES then a return is made to selecting the next character (function 21 in FIG. 3).

Although the invention has been described with reference to a specific embodiment, this description is not meant to be construed in a limiting sense. Various modifications of the disclosed embodiment as well as alternative embodiments of the invention will become apparent to one skilled in the art upon reference to the description of the invention. It is therefore contemplated that the appended claims will cover any such modifications of embodiments that fall within the true scope of the invention.

What is claimed is:

1. In a computer system having a CPU with a memory coupled thereto, a line buffer within said memory, an I/O processor coupled to said CPU and to said memory and a printer connected to said system through said I/O processor, a method for modifying commands to said printer, said method operating in said CPU comprising the steps of:

a. storing in said line buffer a block of characters to be printed;

b. examining said block of characters for an operation code to determine if a line of said block of characters is to be overprinted, and if said line is to be overprinted;

c. examining each position in said line of said block of characters to be printed for the same character, and if the same character is found, incrementing an overprint count stored in said memory for said same character;

d. for each character to be printed, indexing into a table of attributes stored in said memory as a function of said overprint count of step c hereof;

e. extracting an attribute setting code from said table for each of said characters to be printed based upon said overprint count of step c hereof;

f. transmitting said attribute setting code extracted in step e hereof to said printer for printing;

g. determining if said line buffer is empty, and if empty, getting a next block of characters to be printed and repeating all of the steps above; and, h. if said line buffer is not empty, selecting a next character to be printed and its corresponding overprint count from said memory for indexing into said table.

2. A method for modifying commands to a printer coupled to a computer system by an I/O processor, said system including a CPU having a memory coupled thereto and a line buffer included within said memory, said I/O processor being coupled to said line buffer and to said CPU, said method operating in said CPU comprising the steps of:

a. storing in said line buffer a block of characters to be printed;

b. examining each character in said block of characters to determine if an end of said block of characters has been reached, and if not reached;

c. inquiring if a same character is repeated at a same position in said block of characters, and if yes;

d. incrementing an overprint count for said character, said overprint count being stored in said memory;

e. if not same character at same position in said block of characters, storing a new character in said line buffer at that same position with an overprint count equal to one;

f. if end of said block of characters has been reached, selecting next character from said line buffer;

g. for each character to be printed, indexing into a table of attribute setting codes, and extracting therefrom an attribute setting code for said character to be printed as a function of said overprint count;

h. transmitting said attribute setting code extracted in the preceding step hereof to said printer for printing;

i. determining if said line buffer is empty, and if empty, getting a next block of characters to be printed and repeating all of the steps above; and, j. if said line buffer is not empty, selecting a next character to be printed and its corresponding overprint count from said line buffer for indexing into said table.

* * * * *